United States Patent Office 2,803,258
Patented Aug. 20, 1957

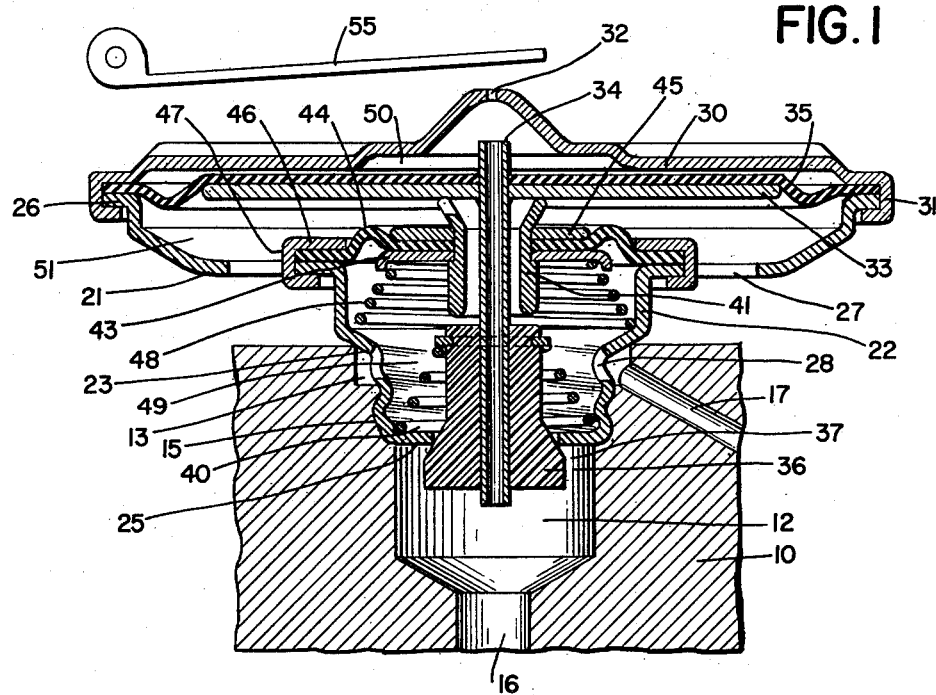

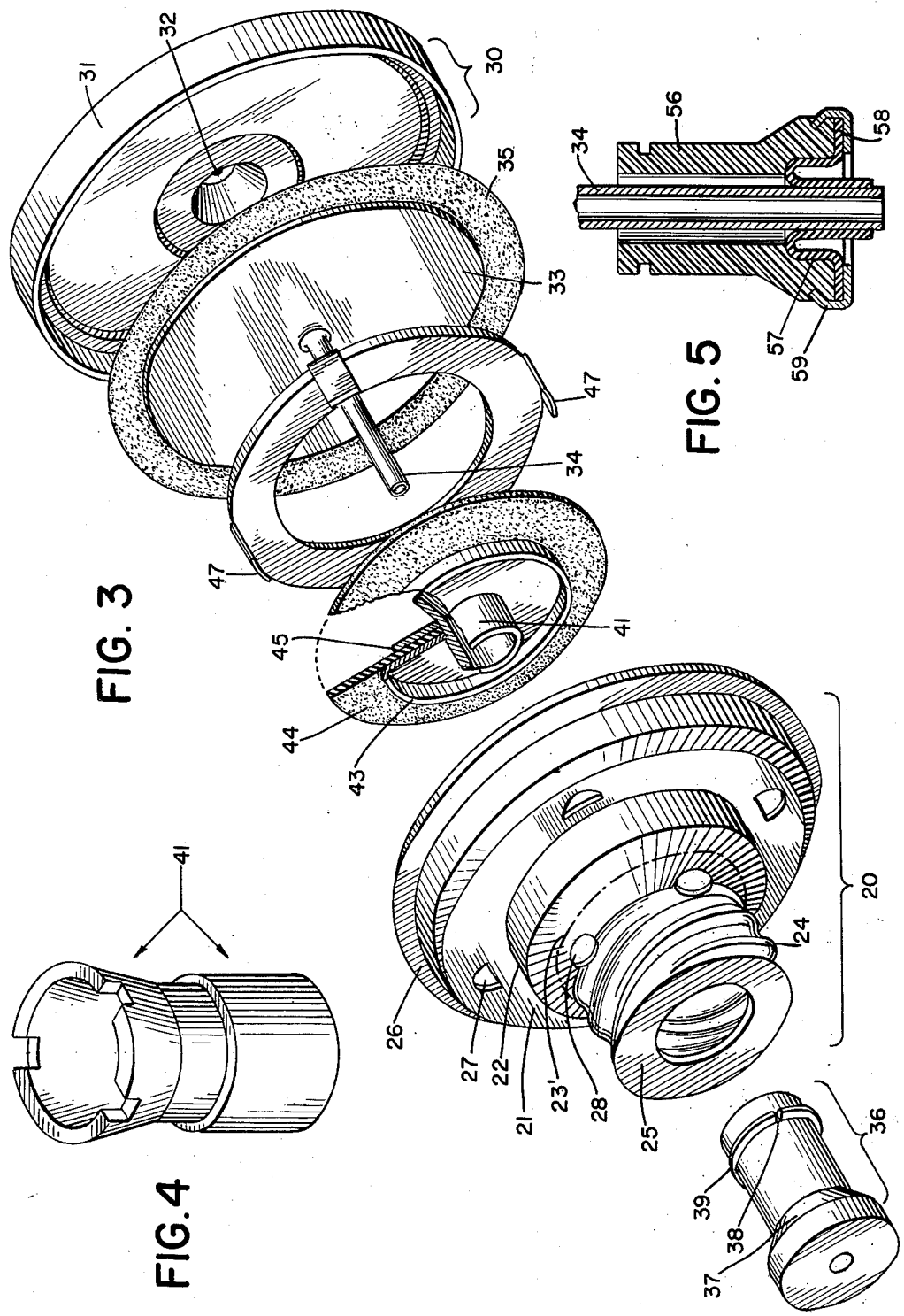

2,803,258

DISPOSABLE PILOT VALVE

Ernest F. Dyson, Meriden, Conn., assignor to The Bristol Company, Waterbury, Conn., a corporation of Connecticut Application June 16, 1954, Serial No. 437,266

13 Claims. (Cl. 137—82)

This invention relates to pilot valves for fluid-actuated control apparatus, and more especially to a removable and disposable pilot valve for pneumatic control devices. This application is a continuation-in-part of my application for "Relay Valve," filed December 11, 1952, Serial Number 325,469, now Pat. No. 2,780,242.

A common form of pilot valve for pneumatic control involves a seating member subject to actuation by variations in fluid pressure on a diaphragm or in a capsular spring, the seating member cooperating with a seat to provide a variable closure in a conduit conducting compressed air to a pneumatic motor-operated control apparatus. Said fluid pressure is regulated by means of a supply-and-waste member wherein the admission of air is limited by means of a fixed restriction in the supply and the escape is controlled by means of a vane, baffle, "flapper" or obturator more or less juxtaposed to a small escape orifice communicating with the atmosphere. The principle of these pilot valves is well known, and they are available in a considerable variety of forms. In general, however, they are delicate in construction, and of such cost that in the event of damage or malfunctioning they may not economically be discarded but require to be repaired and readjusted, with consequent uncertain and high costs as well as indefinite shut-downs of associated plant equipment.

It is an object of the present invention to provide a pilot valve having desirable operating characteristics and adapted to manufacture on a production basis by automatic machinery, and hence of such low cost as to be economically disposable in case of damage.

It is a further object to provide a valve of the above type which may quickly be removed and replaced without the need for special tools or great skill in manipulation.

It is a further object to provide a pilot valve having incorporated in its structure the constriction essential to the supply-and-waste method of control, said constriction being of a nature not subject to clogging or stoppage by foreign particles entrained in the air stream.

In carrying out the purposes of the invention there may be provided a pilot valve assembly whose metal parts are principally stamped or spun from sheet material, or cut from standard tubing, and whose non-metallic components are comprised in simple diaphragm elements of uniform thickness and a plug member either moulded from suitable thermosetting material or machined from a plastic bar stock. The design embodying the principles of the invention eliminates the need for cross-drilling or tapping, or the shaping and fitting of tubular conduits, and requires no bolts, screws or rivets in its assembly.

Other features and advantages of the invention will be hereinafter described and claimed.

In the drawings:

Figures 1 and 2 are side elevations in section, showing in its two extreme operating positions a pilot valve embodying the principles of the invention.

Figure 3 is an isometric exploded view of the valve, showing most of its component parts.

Figure 4 is a detail of an element of the assembly shown in Figures 1 and 2.

Figure 5 is a sectional view showing an alternative form of a component of the valve structure.

While the apparatus of the present invention and the immediately associated instrumentalities are adapted to operation by any suitable expansible fluid, the most common medium for this purpose is compressed air at a supply pressure of the order of 20 pounds per square inch; and in the interest of simplicity and clarity the description will be given as applicable to such a system, without in any way excluding the use of other fluid agents should their utilization be found expedient.

Referring now to the drawings:

The numeral 10 designates a portion of a controller component commonly known as an "air-block," formed usually of metal, and having therein one or more openings, each providing a receptacle for one of the pilot valves to which the present invention is directed. Each of the openings in the air-block 10 comprises an inner cavity 12 and an outer counterbored portion 13 separated from said cavity by a section 15 having formed therein a female knuckle thread. The inner cavity 12 communicates with an air supply source 16, and the outer portion 13 with a conduit 17 providing communication to the diaphragm motor or corresponding actuating element of a control valve 18 to be operated through the functioning of the pilot valve to which the invention is directed. The outer edge of the counterbored portion 13 where the opening intersects the surface of the air-block 10 is machined to a smooth surface, either forming a right angle, or slightly chamfered for sealing engagement with a further element now to be described.

The principal supporting and enclosing body of the pilot valve forming the present invention comprises a shell member 20 (Figure 3), preferably formed from a single piece of sheet metal stock, and having a circular flanged upper portion 21, a cylindrical intermediate portion 22, a conically conformed or funnel section 23, a threaded lower portion 24, and a plane inwardly-extending annular portion 25. The flanged portion 21 is substantially saucer-shaped and is provided with a radially-extending edge part 26 adapted for engagement by a further member presently to be described. The flat base of the portion 21 is pierced with a plurality of openings 27, one function of which is to provide unobstructed communication between the interior and the exterior of that portion of the assembly.

The cylindrical portion 22, extending as a broad "stem" downwardly from the base of the saucer portion 21, is formed to an external diameter somewhat greater than that of the machined edge of the counterbored opening 13, and provides internal space to contain certain mechanical elements hereinafter to be set forth. The conical section 23 is tapered from a maximum outside diameter corresponding to that of the cylindrical portion 22 to a minimum diameter less than that of the counterbore 13, thus providing for sealing engagement between the outer surface of said conical portion and said machined edge, as on a line 23', when forced into intimate contact therewith.

The portion 24 is formed with a male knuckle thread to cooperate with the thread 15 in the block 10, whereby the shell member may be firmly screwed into said block, bringing the outer surface of the conical section 23 into sealing relationship with the edge of the counterbore 13 on the line 23', and at the same time causing the flattened portion 25 to bottom in said thread and provide a seal between the counterbore 13 and the cavity 12. Near the junction between the sections 23 and 24, and within the circular line 23', the shell member 20 is provided with one or more perforations 28 permitting free communication between the interior of the shell and the counterbore 13.

In order to complete the closure of the shell member 20 there is provided a circular domed or dished top member 30 conformed to engage the flanged portion 21 and having an axially extending cylindrical edge portion 31 adapted to encircle the radially projecting edge 26 of said flanged portion and to be secured thereto as presently to be described. The member 30 is further provided with a centrally located upwardly extending boss portion having therein a small aperture 32 adapted to the passage of air therethrough.

Centrally located within the flanged portion 21 and having a diameter of the order of ⅝ of the same is a circular plate 33 to the center of which is integrally secured, as by welding, brazing or soldering, a straight tubular member 34 having a capillary bore. Said tubular member projects perpendicularly through said plate extending upward an appreciable distance from the top surface thereof, and downward to the interior of the cavity 12; and, with said plate, the tubular member 34 is free for limited axial displacement. Juxtaposed to the plate 33 and flatly engaging its upper surface is a flexible circular diaphragm 35 formed of sheet rubber, neoprene, or equivalent resilient material, and of sufficient diameter to lie within the edge part 31 of said top member 30 for clamping engagement thereby against the outwardly extending edge 26 of the flanged portion 21. The upwardly extending projection of the tubular member 34 passes tightly through a central perforation in the diaphragm 35.

Positioned within the opening of the annular flat portion 25 of the shell 20, and free for limited axial displacement therein, is a plug member 36 formed of slightly resilient material such as "hard" rubber or moulded or machined plastic having a central bore to make a sliding fit with the exterior surface of tubular member 34 and having a cylindrical portion extending upwardly within the threaded and the conical portions of the shell 20 and an enlarged portion extending below the flat shell portion 25 and adapted to lie within the cavity 12 when the valve assembly is fitted into the airblock 10. Between said extended portions of the plug member 36 is a conical portion 37 conformed to engage the inner edge of the circular opening in the portion 25 when said plug is forced in an upward sense, and thereby to establish a fluid-tight seal therewith. The inner end of the upwardly extending portion of the plug member 36 is porvided with a groove 38 adapted to receive a retaining ring 39; and against the lower side of said ring bears the upper extremity of a conically conformed compression spring 40, whose lower extremity rests upon the inner face of the annular shell portion 25, and is centrally constrained therein by the threaded portion 24. The upper surface of the plug member 36 is finished smooth to provide a surface for sealing with a member now to be described.

Coaxially surrounding the portion of the tubular member 34 between the plug member 36 and the plate 33 is an extended annular sleeve or collar 41 having an internal diameter substantially greater than the outside of said tubular member, and having its lower end faced to engage the upper surface of the plug member 36, and when so engaged to form a substantially fluid-tight seal. The upper end of the sleeve 41 is adapted to bear against the lower surface of the plate 33, and is either castellated or perforated in order that, while providing firm mechanical engagement therewith, it cannot interfere with free fluid communication between the interior of said sleeve and the space below said plate. For a portion of its axial length toward its upper end the cylindrical outer surface of the sleeve 41 is reduced in diameter, and fitted to this part is a circular plate member 43 of somewhat smaller diameter than the interior of the cylindrical portion 22 of the shell 21, and preferably having a downwardly turned edge portion. Upon the plate member 43 rests a flexible diaphragm 44 of greater diameter than said shell portion 22 and adapted to engage the interior of the flat base of the flanged shell portion 21. A circular plate 45, preferably of slightly less diameter than the plate 43, rests upon the upper surface of the diaphragm 44; and the upper extremity of the sleeve 41 is flared outwardly to engage said plate 45, whereby to clamp the diaphragm 44 between the plates 45 and 43, and to secure the same into an assembly integral with said sleeve. An annular plate 46 having an internal diameter substantially the same as that of the shell section 22, and provided with perpendicularly projecting lugs 47 is adapted to lie upon the outer edge of the diaphragm 44, with the lugs extending through the openings 27, whereby the latter may be crimped beneath the lower face of the flanged portion 21 for clamping and sealing the diaphragm 44 to said flanged portion and isolating the interior of the lower part of the shell member from the surrounding atmosphere. It will be understood that, since the lugs 47 do not completely fill the openings 27, they provide substantially no obstruction to the free movement of air therethrough. A conical compression spring 48 is extended between the interior surface of the conical portion 23 and the lower face of the plate 45, whereby to urge the assembly, including the sleeve 41, into engagement with the lower surface of plate 33.

In assembling the above-described component parts into a complete pilot valve unit, the plug member 36 is first passed into the lower part of the shell 20 until its tapered portion 37 engages the interior of the circular opening in the annular bottom portion 25 of said shell. The spring 40 is then placed within the threaded portion of said shell with its larger diameter toward the bottom and its smaller diameter encircling the upper part of the plug member 36. The spring is then compressed and the retaining ring 39 fitted within the groove 38, whereby the plug 36 will tend to be held in sealing engagement with the annular shell portion 25. The spring 48 is then placed within the portion 22 of the shell 20 with its larger diameter resting in the tapered portion 23. The component comprising the sleeve 41 and the plates 43 and 45 with the diaphragm 44 clamped therebetween is then positioned with the bottom portion of said sleeve resting upon the top surface of the plug member 36. The plate 46 is placed upon the diaphragm 44 with its lugs 47 passing around the edge of the same and projecting downward through the several openings 27 in the member 20. Said lugs are then forcibly bent inward, clamping the lower part of the assembly into a unit and forming within the lower part of the shell 20 a chamber 49 separated from the upper part by the flexible diaphragm 44, and from the cavity 12 by the plug member 36.

The component comprising the plate 33 and centrally attached capillary tube 34 is then positioned upon the flared edge of the sleeve 41 with said tube passing through the bore of the plug member 36. The diaphragm 35 is placed upon the top of the plate 33 with the upper extremity of the tube 34 projecting through the central opening therein; and the top member 30 placed over the same with its cylindrical edge portion 31 encircling the periphery of the diaphragm 35 and the flanged edge 26 of the shell 20. The edge 31 is then rolled or spun about the encircled parts, completing the assembly of the unit, and separating the upper part thereof into two compartments, an upper chamber 50, communicating with the atmosphere through the orifice 32 and with the cavity 12 through the capillary bore of the tube 34, and a lower chamber 51 communicating with the interior of the sleeve 41 through the opening in the flared end thereof, and also in free communication with the atmosphere through the openings 27 in the shell 20. Thus, the interior of the sleeve 41 is at all times at substantially atmospheric pressure.

As hereinbefore pointed out, when the pilot valve assembly is screwed into the block 10 by means of the mating threaded surfaces with which said parts are provided, the lower portion of said thread serves as a closure for the cavity 12, separating it from the counterbore 13, while the conical portion 23 provides a seal between said counterbore and the atmosphere. At the same time, the perforations 28 at the top of the threaded portion 24 provide permanent communication between the chamber 49 and the counterbore 13, whereby the diaphragm motor of the valve 18 will at all times be maintained at substantially the pressure existing within said chamber.

Operatively associated with the valve is a vane or baffle member 55 movably juxtaposed to the orifice 32, whereby more or less to obstruct the escape of air therefrom, thus to command the operation of the pilot valve as now to be fully explained.

The sectional view in Figure 1 shows the pilot valve with its several parts in their "normal" positions, i. e., the positions they normally assume when subjected to no fluid pressures other than atmospheric. The plug member 36 will be forced by the influence of the spring 40 into sealing engagement with the annular bottom portion 25 of the shell 20 thereby isolating the chamber 49 from the cavity 12. Under the influence of the spring 48 the plate 43, the sleeve 41, and parts integral therewith will be urged in an upward sense, engaging the plate 33 and forcing the diaphragm 35 to its topmost position, reducing the space in the chamber 50 to its minimum internal volume. Upward travel of the plug member 36 being limited by its engagement with the annular portion 25, the mating surfaces of said plug member and the sleeve 41 will be separated, providing free communication between the chamber 49 and the atmosphere.

Upon admission of air pressure from the source 16 to the cavity 12, air will be prevented by the plug member 36 from entering the chamber 49 in the lower part of the shell 20, and will build up substantially the supply pressure in said cavity, with a limited continuous flow through the capillary bore of the member 34 into the chamber 50. The baffle 55 being, as shown in Figure 1, an appreciable distance removed from the orifice 32, escape of air through said orifice is limited only by dimensions of the opening. The relative dimensions of said orifice and the capillary 34 being suitably selected with respect to the characteristics of the components of the assembly, such pressure as may build up in the chamber 50 will be insufficient to overcome the force of the spring 48 whereby to initiate any action of the mechanical parts, which will therefore remain in the respective positions as hereinbefore described; and the control valve 18 will stand with its motor element at atmospheric pressure.

Attention may now be directed to conditions developing when, through external mechanical agency constituting the primary control influence, the baffle member 55 is brought into close juxtaposition to the orifice 32 whereby significantly to obstruct the escape of air therethrough, such conditions being fully shown in Figure 2. Obstruction or closure of the orifice 32 will cause air pressure to be built up within the chamber 50 until the force upon the diaphragm 35 overcomes that of the spring 48, causing said diaphragm, the plate 33 and the sleeve 41 with attached parts, to be moved in a downward sense, bringing the lower surface of said sleeve into sealing engagement with the top of the plug member 36, whereby to cut off communication between the chamber 49 and the atmosphere. Pressure of the sleeve 41 upon the plug member 36 will then cause the latter to be moved in a downward sense in opposition to the force of the spring 40, whereby to provide an annular opening around the tapered section 37 of the plug 36 and allow free communication between the cavity 12 and the chamber 49. Air from the supply source 16 will now be free to enter said chamber, and, passing through the openings 28 into the counterbore 13, to be admitted to the motor element of the control valve 18 to actuate the same.

It is to be noted that the surface area of diaphragm 35 exposed to the pressure developed in chamber 50 is substantially larger than the area of diaphragm 44 presented toward chamber 49. Because of the relative areas of diaphragms 35 and 44, when plug member 36 is unseated and the pressure of the source is transferred to diaphragm 44, the net force is still downward thereby holding plug member 36 open an amount proportional to the back pressure in chamber 50.

So long as the vane or baffle 55 is retained in the position indicated in Figure 2, where it more or less obstructs escape of air from the orifice 32, thereby maintaining a substantial positive pressure in the chamber 50, the movable parts of the pilot valve will remain in the respective positions indicated in Figure 2, and control pressure will be maintained upon the motor element of the control valve 18. Upon movement of the vane 55 away from its juxtaposition to the orifice 32, as indicated in Figure 1, air will escape through said orifice at an accelerated rate, so that the pressure within the chamber 50 will fall to a value only slightly above atmospheric, whereupon the internal parts of the pilot valve will revert to the respective positions shown in Figure 1, the supply of control air will be cut off from the motor element of the control valve 18, and the latter, being placed in free communication with the atmosphere, will revert to its "deenergized" position.

An important advantage accrues from the type of construction illustrated here in that clogging of the fixed restriction limiting the fluid supply to the valve which has been a common cause of erratic performance and frequent shut down of pilot valves heretofore known is virtually eliminated thereby insuring greatly improved operation. As has been indicated above, the capillary bore of elongated tubular member 34 forms the fixed restriction referred to and is relatively long in the direction of flow. In fact, tube 34 extends, in the present instance, over the major portion of the axial length of the valve body itself. As clearly shown, tubular member 34 projects into the inlet chamber formed in air-block 10; consequently there is little or no likelihood of foreign matter which may be entrained in the pressure-fluid finding its way into and then clogging the capillary bore. This follows in part from the fact that entrained particles which reach the walls of chamber 12 may not now be swept along by the pressure-fluid into the bore due to the portion of tube 34 projecting beyond plug member 36 acting as an obstruction thereto. Furthermore, the extended length of the capillary bore in tube 34 functions as a distributed resistance to the flow of the pressure-fluid therethrough thereby permitting the use of a bore diameter which is large as compared to the diameter of an opening which is relatively short in the direction of flow to obtain a predetermined flow-restricting effect and thus further reducing the possibility of clogging.

In the form of the invention as thus far described, the outside surface of the capillary tube member 34 is a sliding fit within the bore of the plug member 36, this being necessary in order to permit relative longitudinal motion between the two elements whereby the sleeve 41 may be moved into and out of sealing engagement with the upper surface of said plug member. In this way, there is a continuous leak of air from the cavity 12 alongside said tube member to the interior of said sleeve, and thus to the atmosphere. While the sectional area of the annular space about the tubular member 34 can be made very small in relation to its axial length, the clearance essential to positive operation cannot be wholly avoided, with the consequence that with the construction shown a certain continuous wastage of air is unavoidable.

In Figure 5 is shown means whereby leakage through the plug 36 may be completely eliminated. The modification consists in replacement of the plug member 36, as described in the previous embodiment of the invention, by a plug member 56 exteriorly similar to the plug 36 but having its interior opening of considerably greater diameter than the outside of tubular member 34, and being formed with an enlarged recess 57 at its lower extremity. In assembly, the tubular member 34 is surrounded by a tight-fitting annular diaphragm 58 of rubber or similar yielding and non-permeable material, sealed to the lower extremity of said tubular member to form an airtight joint, and having a convolute portion adapted to lie in the recess 57 and a flat portion adapted to rest upon the bottom part of said plug. The diaphragm 58 is secured to the bottom of the plug 56 by means of a clamping ring 59 provided with claws or lugs pressed into suitable openings formed in the lower cylindrical portion of said plug. The flexible diaphragm 58 thus provides a positive seal between the cavity 12 containing air at supply pressure and the chamber 51 which communicates freely with the atmosphere. Such axial force as may be exerted on the diaphragm 58 due to the excess of supply over atmospheric pressure will tend to move the tubular member 34 and attached parts toward the upper part of the shell; and as relative motion between said tubular member and the plug member 56 is permitted by the convoluted portion of the diaphragm 58, such displacement will not adversely affect the performance of the unit as a whole under any of its operating conditions.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What is claimed is:

1. A pilot valve adapted to control the flow of a fluid from a pressure source to a motor element in response to variations in the flow of a relatively small volume of fluid initiated by independent control means, comprising a substantially hollow body having an inlet adapted to be coupled to said source and an outlet adapted to be coupled to said motor element, movable means forming with spaced portions of the interior of said body a first variable-volume chamber normally having a predetermined volume and a second chamber, said movable means including a plate-like member having a predetermined surface area extending transversely to an axis of said body, said body having an orifice formed therein affording communication between said first chamber and the atmosphere, an elongated tubular member engirdled by said movable means axially extending in said body and having an open ended capillary bore formed therein throughout its length of substantially uniform diameter and communicating through said movable means with said first chamber, said bore communicating through said inlet with said source when said body is coupled thereto so that a small volume of fluid normally passes from said source through said bore into said first chamber to escape through said orifice, said second chamber being in communication with said inlet and outlet and normally in communication with the atmosphere through an opening in said body, said inlet, orifice and tubular member being axially aligned one with the other and coaxial with said hollow body, plug means actuated by said movable means and normally sealing said inlet, said plug means having a surface area transversely to said axis which is substantially less than said predetermined surface area, said bore communicating through said plug means with said source, and said movable means being shiftable on increase in the volume of said first chamber to seal off said second chamber from the atmosphere and actuate said plug means to open said inlet.

2. A pilot valve adapted to control the flow of a fluid from a pressure source to a motor element in response to variations in the flow of a relatively small volume of fluid initiated by independent control means, comprising a substantially hollow body having an inlet adapted to be coupled to said source and an outlet adapted to be coupled to said motor element, movable means forming with spaced portions of the interior of said body a first variable-volume chamber normally having a predetermined volume and a second chamber, said movable means including a plate-like member having a predetermined surface area extending transversely to an axis of said body, said body having an orifice formed therein affording communication between said first chamber and the atmosphere, an elongated tubular member engirdled by said movable means axially extending in said body and having an open ended capillary bore formed therein, said tubular member extending through said movable means with said bore communicating with said first chamber, said tubular member extending through said inlet and beyond said body with said bore in communication with said source when said body is coupled thereto so that a small volume of fluid normally passes from said source through said bore into said chamber to escape through said orifice, said second chamber being in communication with said inlet and outlet and normally in communication with the atmosphere through an opening in said body, a plug member surrounding a portion of said tubular member and axially displaceable relative thereto from sealing engagement with said inlet to a position opening said inlet, said plug member having a surface area transversely to said axis which is substantially less than said predetermined surface area, said tubular member extending through said plug member, and said movable means being shiftable on increase in the volume of said first chamber to seal off said second chamber from the atmosphere and to move said plug member to its open position.

3. A pilot valve adapted to control the flow of a fluid from a pressure source to a motor element in response to variations in the flow of a relatively small volume of fluid initiated by independent control means, comprising a substantially hollow body having an inlet adapted to be coupled to said source and an outlet adapted to be coupled to said motor element, movable means forming with spaced portions of the interior of said body a first variable-volume chamber normally having a predetermined volume and a second chamber, said movable means including a plate-like member having a predetermined surface area extending transversely to an axis of said body, said body having an orifice formed therein affording communication between said first chamber and the atmosphere, an elongated tubular member engirdled by said movable means axially extending in said body and having an open ended capillary bore formed therein, said tubular member extending through said movable means with said bore communicating with said first chamber, said tubular member extending through said inlet and beyond said body with said bore in communication with said source when said body is coupled thereto so that a small volume of fluid normally passes from said source through said bore into said chamber to escape through said orifice, said second chamber being in communication with said inlet and outlet and normally in communication with the atmosphere through an opening in said body, a plug member surrounding a portion of said tubular member and axially displaceable relative thereto from sealing engagement with said inlet to a position opening said inlet, said plug member having a surface area transversely to said axis which is substantially less than said predetermined surface area, said tubular member extending through said plug member, resilient means urging said movable means in a direction to maintain the predetermined volume of said first chamber and said plug member into sealing engagement with said opening, and said movable means being shiftable on increase in the volume of said first chamber to seal off said second chamber from the atmosphere and to move said plug member to its open position.

4. A pressure responsive valve for controlling the passage therethrough of a fluid from a pressure source, comprising a substantially hollow body adapted to be coupled to said source and having an inlet and an outlet for said fluid as well as an orifice formed therein, first movable means forming with a portion of the interior of said body a first variable-volume chamber communicating with said orifice, said movable means including a plate-like member having a predetermined surface area extending transversely to an axis of said body, an elongated tubular member axially extending in said body and having an open ended capillary bore formed therein throughout its length of substantially uniform diameter and communicating through said first movable means with said first chamber, said bore communicating also with said source when said body is coupled thereto, said first chamber communicating with said orifice and with said capillary bore, second movable means movable independently of and actuated by said first movable means and forming with other portions of said body a second chamber in communication with said inlet and outlet openings, plug means actuated by said second movable means and movable into and out of sealing engagement with said body for closing and opening said inlet, said second movable means and said plug means having a surface area transversely to said axis which is substantially less than said predetermined surface area, said tubular member extending through said second movable means and said plug means, said second movable means in one position providing communication between said second chamber and the atmosphere and in another position sealing off said second chamber from the atmosphere and actuating said plug means to open said inlet, and said inlet, orifice, tubular member and first and second movable means being axially aligned one with the other and coaxial with said hollow body, whereby fluid may continually reach said first chamber from said source through said capillary bore and when the pressure of the fluid in said first chamber is substantially at atmospheric pressure said second chamber is maintained in communication with the atmosphere and sealed off from said source.

5. A pilot valve adapted to control the flow of a fluid from a pressure source to a motor element in response to variations in the flow of a relatively small volume of fluid initiated by independent control means, comprising a substantially hollow body having an inlet adapted to be coupled to said source and an outlet adapted to be coupled to said motor element, first movable diaphragm means forming with a portion of the interior of said body a first variable-volume chamber normally having a predetermined volume, said first movable diaphragm means having a predetermined surface area extending transversely to an axis of said body, said body having an orifice formed therein affording communication between said first chamber and the atmosphere, an elongated tubular member axially extending in said body and having an open ended capillary bore formed therein throughout its length of substantially uniform diameter and communicating through said first diaphragm means with said first chamber and through said body with said source when said body is coupled thereto so that a small volume of fluid normally passes from said source through said bore into said first chamber to escape through said orifice, second movable diaphragm means movable independently of and actuated by said first diaphragm means and forming with other portions of said body a second chamber in communication with said inlet and said outlet, said second diaphragm means including an annular member having an inner space normally communicating with the atmosphere and with said second chamber, plug means actuated by and normally spaced from said second diaphragm means and normally sealing said inlet, said second diaphragm means and said plug means having a surface area transverse to said axis which is substantially less than said predetermined surface area, said elongated tubular member extending through said annular member and said plug means, said second diaphragm means when actuated by said first movable means being shiftable into engagement with said plug means to seal said second chamber from the atmosphere and to shift said plug means out of its normal position to open said inlet, said inlet, orifice tubular member and first and second movable diaphragm means being axially aligned one with the other and coaxial with said hollow body, whereby a reduction in the escape of fluid through said orifice as may be initiated by said independent control means causes an increase in the volume of said first chamber and a consequent sealing of said second chamber from the atmosphere and opening of said inlet.

6. A pilot valve adapted to control the flow of a fluid from a pressure source to a motor element in response to variations in the flow of a relatively small volume of fluid initiated by independent control means, comprising a substantially hollow body having an inlet adapted to be coupled to said source and an outlet adapted to be coupled to said motor element, first movable diaphragm means forming with a portion of the interior of said body a first variable-volume chamber normally having a predetermined volume, said first movable diaphragm means having a predetermined surface area extending transversely to an axis of said body, said body having an orifice formed therein affording communication between said first chamber and the atmosphere, an elongated tubular member axially extending in said body and having an open ended capillary bore formed therein, said tubular member being sealed through said first diaphragm means with said bore communicating with said first chamber, said tubular member extending through said inlet and beyond said body with said bore in communication with said source when said body is coupled thereto so that a small volume of fluid normally passes from said source through said bore into said chamber to escape through said orifice, second movable diaphragm means actuated by said first diaphragm means and forming with other portions of said body a second chamber surrounding said tubular member and in communication with said inlet and said outlet, a plug member surrounding a portion of said tubular member and axially displaceable relative thereto from sealing engagement with said inlet to a position opening said inlet, said second diaphragm means and said plug member having a surface area transverse to said axis which is substantially less than said predetermined surface area, said second diaphragm means in one position providing communication between said second chamber and the atmosphere and in another position sealing off said second chamber from the atmosphere and displacing said plug member to open said inlet thereby placing said second chamber in communication with said source, whereby a reduction in the escape of fluid through said orifice as may be initiated by said independent control means causes an increase in the volume of said first chamber and a consequent sealing of said second chamber from the atmosphere and opening of said inlet.

7. A pilot valve adapted to control the flow of a fluid from a pressure source to a motor element in response to variations in the flow of a relatively small volume of fluid initiated by independent control means, comprising a substantially hollow body having an inlet adapted to be coupled to said source and an outlet adapted to be coupled to said motor element, first movable diaphragm means forming with a portion of the interior of said body a first variable-volume chamber normally having a predetermined volume, said first movable diaphragm means having a predetermined surface area extending transversely to an axis of said body, said body having an orifice formed therein affording communication between said first chamber and the atmosphere, an elongated tubular member axially extending in said body and having an open ended capillary bore formed therein, said tubular member being sealed through said first diaphragm means with said bore communicating with said first chamber, said tubular member extending through said inlet and beyond said body with said bore in communication with said source when said body is coupled thereto so that a small volume of fluid normally passes from said source through said bore into said chamber to escape through said orifice, second movable diaphragm means actuated by said first diaphragm means and forming with other portions of said body a second chamber surrounding said tubular member and in communication with said inlet and said outlet, a plug member surrounding a portion of said tubular member and axially displaceable relative thereto from sealing engagement with said inlet to a position opening said inlet, said second diaphragm means and said plug member having a surface area transverse to said axis which is substantially less than said predetermined surface area, said second diaphragm means in one position providing communication between said second chamber and the atmosphere and in another position sealing off said second chamber from the atmosphere and displacing said plug member to open said inlet thereby placing said second chamber in communication with said source, and resilient means urging said second diaphragm means toward said one position thereof and urging said plug member into sealing engagement with said inlet, whereby a reduction in the escape of fluid through said orifice as may be initiated by said independent control means causes an increase in the volume of said first chamber and a consequent sealing of said second chamber from the atmosphere and opening of said inlet.

8. In a pilot valve for controlling the flow of a fluid from a pressure source to a conduit in response to variations in the flow of a relatively small volume of fluid from said source initiated by independent control means, an enclosing member, movable means forming with interior walls of said enclosing member a variable-volume chamber normally communicating with the atmosphere through an orifice centrally formed in said enclosing member in one side thereof, said enclosing member further having an inlet adapted to be coupled to said source centrally formed in the opposite side thereof registering with said orifice and an outlet adapted to be coupled to said conduit, said movable means including a closure for said inlet, an elongated tubular member axially alined with said orifice and said inlet having an elongated axial capillary bore formed therethrough extending through said movable means and on one side thereof communicating with said chamber and on the other side thereof projecting through and beyond said closure to receive fluid from said source when said enclosing member is coupled thereto and when said closure limits the flow of fluid through said inlet, said bore forming the sole communication between said source and said chamber, whereby a volume of fluid restricted by said bore may normally flow from said source to said variable-volume chamber and through said orifice.

9. In a pilot valve for controlling the flow of a relatively great volume of fluid from a pressure source to a motor element by varying the escape of a relatively small volume of fluid from said source by changes in the position of a juxtaposed movable baffle, the combination of an enclosing member having sealed therein a larger and a smaller flexible diaphragm, said diaphragms being relatively displaced and independently movable along a common axis and separately cooperating with internal walls of said enclosing member to form respectively a first and a second variable-volume chamber, the first chamber, formed by said larger diaphragm, communicating with the atmosphere through an orifice adapted to be more or less obstructed by said movable baffle, and the second chamber, formed by said smaller diaphragm, communicating with said source through an inlet opening in a wall of said enclosing member, a plug member adapted for limited movement along said axis more or less to obstruct said inlet opening, a spring element normally maintaining said plug member in a position to close said inlet opening, a tubular member attached to said larger diaphragm, passing axially and freely through the plug member and having a capillary bore to provide restricted communication between said source and said first chamber, an annular member axially movable with said smaller diaphragm, encircling said tubular member between said larger diaphragm and said plug member and having its inner space in communication with the atmosphere, said annular member being adapted to seat upon said plug member to seal said second chamber from communication with said inner space and upon further displacement to force said plug member away from its position of sealing said opening, spring means urging said annular member away from engagement with said plug member to permit free communication between said second chamber and the atmosphere and to urge said larger diaphragm in a sense to minimize the volume of said first chamber, and means for permitting fluid communication between said second chamber and said motor element.

10. A pilot valve for cooperation with an air-block having an inner cavity connected to a fluid-pressure supply and an outer cavity coaxial therewith and connected to a fluid-operable motor element and having an internally threaded section between said cavities, and for the purpose of controlling the flow of an expansible fluid from said inner to said outer cavity and alternatively from said outer cavity to the atmosphere, said pilot valve comprising an enclosing shell having a base member and a cover member, said base member including an externally threaded portion adapted to cooperate with the internally threaded section between said cavities in securing said shell in said air-block and in providing a seal between said cavities, an expanded conical portion adapted to cooperate with the edge of said outer cavity in sealing the same from communication with the atmosphere and perforated to provide communication between the interior of said base portion and said outer cavity, and a further expanded portion having a flat section and adapted for sealing engagement with said cover member and provided with perforations in said flat section whereby the interior of said further expanded portion is in communication with the atmosphere, a movable plug member having an axial bore therethrough and externally adapted to cooperate with said base portion to seal the interior thereof from communication with said inner cavity, spring means normally tending to maintain said plug member in sealing realtionship with said base portion, a first flexible diaphragm sealed between said further expanded portion of said base member and said cover member to form a first variable-volume enclosed chamber within the latter, said cover member having an orifice to provide controllable fluid therethrough from said first chamber to the atmosphere, a tubular member attached to said diaphragm, projecting into said inner cavity, and passing freely through the axial bore of said plug member whereby to provide restricted communication between said inner cavity and said first chamber, a second flexible diaphragm adapted to lie within said further expanded portion, a ring member adapted to engage the edge of said second diaphragm and provided with axially extending lug portions passing through said perforations and bent over whereby said ring member secures said second diaphragm against the flat section of said further expanded portion in sealing relation to form a second variable-volume chamber within the interior of said base portion and in communication with said outer cavity, an annular member axially movable with said second diaphragm, encircling said tubular member between said first diaphragm and said plug member and having its inner space in communication with the atmosphere and adapted to seat upon said plug member to seal said second chamber from communication with said inner space and upon further displacement to force said plug away from its position of sealing cooperation with said base portion, spring means urging said annular member away from seating relation with said plug member to permit free communication between said second chamber and the atmosphere and to urge said first diaphragm in a sense to minimize the volume of said first chamber.

11. A pilot valve as set forth in claim 2 comprising means movably sealing said tubular member and said plug member one to the other.

12. A pilot valve as set forth in claim 2 comprising a flexible diaphragm extending between and connected to said tubular member and plug member providing a seal therebetween while permitting displacement of said tubular member relative to said plug member.

13. In a pilot valve as set forth in claim 8, flexible means extending between said tubular member and said closure providing a seal therebetween while permitting displacement of said tubular member relative to said closure.

References Cited in the file of this patent

UNITED STATES PATENTS

| | | |
|---|---|---|
| 560,230 | Powers | May 19, 1896 |
| 1,666,270 | Soderberg | Apr. 17, 1928 |
| 1,834,773 | Fellman et al. | Dec. 1, 1931 |
| 2,187,465 | Simonick | Jan. 16, 1940 |
| 2,261,827 | Brown | Nov. 4, 1941 |
| 2,566,708 | Trevaskis | Sept. 4, 1951 |
| 2,629,365 | Kennedy | Feb. 24, 1953 |
| 2,635,618 | Moore | Apr. 21, 1953 |
| 2,751,918 | Higgins | June 26, 1956 |

FOREIGN PATENTS

| | | |
|---|---|---|
| 233,110 | Germany | Mar. 29, 1911 |
| 560,201 | Great Britain | Mar. 24, 1944 |